US007280186B1

(12) United States Patent
Ionov

(10) Patent No.: US 7,280,186 B1
(45) Date of Patent: Oct. 9, 2007

(54) HIGH RESOLUTION CHIRPED/AM OPTICAL FM LASER RADAR

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 361 days.

(21) Appl. No.: 11/056,669

(22) Filed: Feb. 10, 2005

(51) Int. Cl.
*G01C 3/08* (2006.01)

(52) U.S. Cl. .................................... 356/5.15; 356/4.01

(58) Field of Classification Search ............... 356/4.01, 356/5.01, 5.15, 28
See application file for complete search history.

(56) References Cited

U.S. PATENT DOCUMENTS

| | | | | |
|---|---|---|---|---|
| 4,935,616 A * | 6/1990 | Scott | .................... | 250/214 VT |
| 5,151,747 A * | 9/1992 | Nourrcier | .................. | 356/5.09 |
| 5,608,514 A | 3/1997 | Stann et al. | ............... | 356/5.09 |
| 5,877,851 A | 3/1999 | Stann et al. | ............... | 356/5.09 |
| 6,437,854 B2 * | 8/2002 | Hahlweg | ................... | 356/5.09 |
| 6,618,125 B2 * | 9/2003 | Stann | ........................ | 356/5.09 |
| 6,724,467 B1 * | 4/2004 | Billmers et al. | ........... | 356/5.04 |
| 6,844,924 B2 * | 1/2005 | Ruff et al. | ................. | 356/5.09 |
| 7,193,720 B2 * | 3/2007 | Gatt | ........................... | 356/489 |

OTHER PUBLICATIONS

Abstract of Sztankay, G., "Chirped-AM 3D Imaging Laser Radar for DOD Applications," *CLEO/IQEC and PhAST 2004 Conference Program,* Invited Talk, PTuF3, 1 page (May 18, 2004).
Fejer, M.M., et al., "Quasi-Phase-Matched Second Harmonic Generation: Tuning and Tolerances," *IEEE Journal of Quantum Electronics,* vol. 28, No. 11, pp. 2631-2654 (Nov. 1992).
Myers, L.E., et al., "Quasi-Phase-Matched Optical Parametric Oscillators In Bulk Periodically Poled $LiNbO_3$," *J. Opt. Soc. Am. B,* vol. 12, No. 11, pp. 2102-2116 (Nov. 1995).

* cited by examiner

*Primary Examiner*—Isam Alsomiri

(57) ABSTRACT

Optical techniques are disclosed for improving the range resolution of a radar system. An optical source produces chirped optical pulses whose frequency changes linearly with time, wherein the pulse duration is close to the repetition period (quasi cw radiation). The optical source illuminates the target that scatters a portion of the light back into collecting optics of the ladar's receiver. The delayed backscattered optical waveform is mixed optically with a reference waveform in a non-linear medium to produce optical radiation at a new frequency. The spectral properties of the non-linearly generated light contains information about the distance to the target. Different approaches that may be chosen for non-linear optical mixing are disclosed including sum and difference frequency generation in non-linear crystals.

8 Claims, 5 Drawing Sheets

HIGH RESOLUTION CHIRPED/AM OPTICAL FM LASER RADAR

TECHNICAL FIELD

The technology disclosed herein generally relates to laser based radar (ladar) systems that utilize an optical beam for target acquisition. In particular, the present disclosure relates to augmenting such a ladar with a disclosed quasi cw optical FM modulation technique to improve the spatial resolution of the system to 1 mm or better.

BACKGROUND OF THE DISCLOSED TECHNOLOGY

AM laser radar (ladar) technology is known in the art. An existing 3D chirped AM laser radar architecture is modified with high-bandwidth optical FM sensing. A practical implementation of the scheme, which is based on parametric down conversion, is described below. Such an improved architecture improves the special resolution of the laser radar from ~30 cm down to ~1 mm.

3D ladars have been proven efficient in detecting threats through partial covers, e.g., leave coverage. See B. L. Stann, W. C. Ruff, and Z. G. Sztankay, "High range resolution ladar", U.S. Pat. No. 5,608,514, 1997; B. L. Stann, W. C. Ruff, and Z. G. Sztankay, "Scannerless ladar architecture employing focal plane detector arrays and FM-cw ranging theory", U.S. Pat. No. 5,877,851 and, Greg Sztankay, "Chirped-AM 3D imaging laser radar for DOD applications", invited talk, PtuF3, CLEO/PhAST, San Francisco, 2004, the disclosures of which are hereby incorporated herein by reference.

Applications of this technology include ground and airborne reconnaissance, target acquisition/identification, and robotic vehicle navigation. The spatial resolution of such laser radars is of great importance, since it determines the reliability of target/obstacle identification. A hybrid chirped AM/FM laser radar scheme is disclosed herein that offers vastly improved spatial resolution over the current state of the art represented by the documents cited above, for example.

BRIEF DESCRIPTION OF THE DISCLOSED TECHNOLOGY

In one aspect of the invention, an optical laser system includes: a source of optical pulses generated at a frequency ω at an output thereof; a first non-linear optical device responsive to the output of the optical source for the generation of optical radiation at a frequency of 3ω; a first dispersive device for chirping the optical pulses at the frequency of ω; a second dispersive device for chirping the optical radiation at the frequency of 3ω an amplitude modulator for amplitude modulating the chirped optical pulses; transmission optics for transmitting amplitude modulated, chirped optical pulses to a target; reception optics for collecting back-scattered radiation for the target; a second non-linear optical device responsive to the collected back-scattered radiation at the frequency ω and to the chirped optical radiation at the frequency of 3ω for producing a mixed optical signal at 2ω and analysis apparatus for determining relatively fine range resolution information based upon the mixed optical signal at 2ω and relatively coarse range resolution information based upon the collected back-scattered radiation at the frequency ω.

DETAILED DESCRIPTION OF THE FIGURES

DETAILED DESCRIPTION OF A PREFERRED EMBODIMENT

Figure 1:
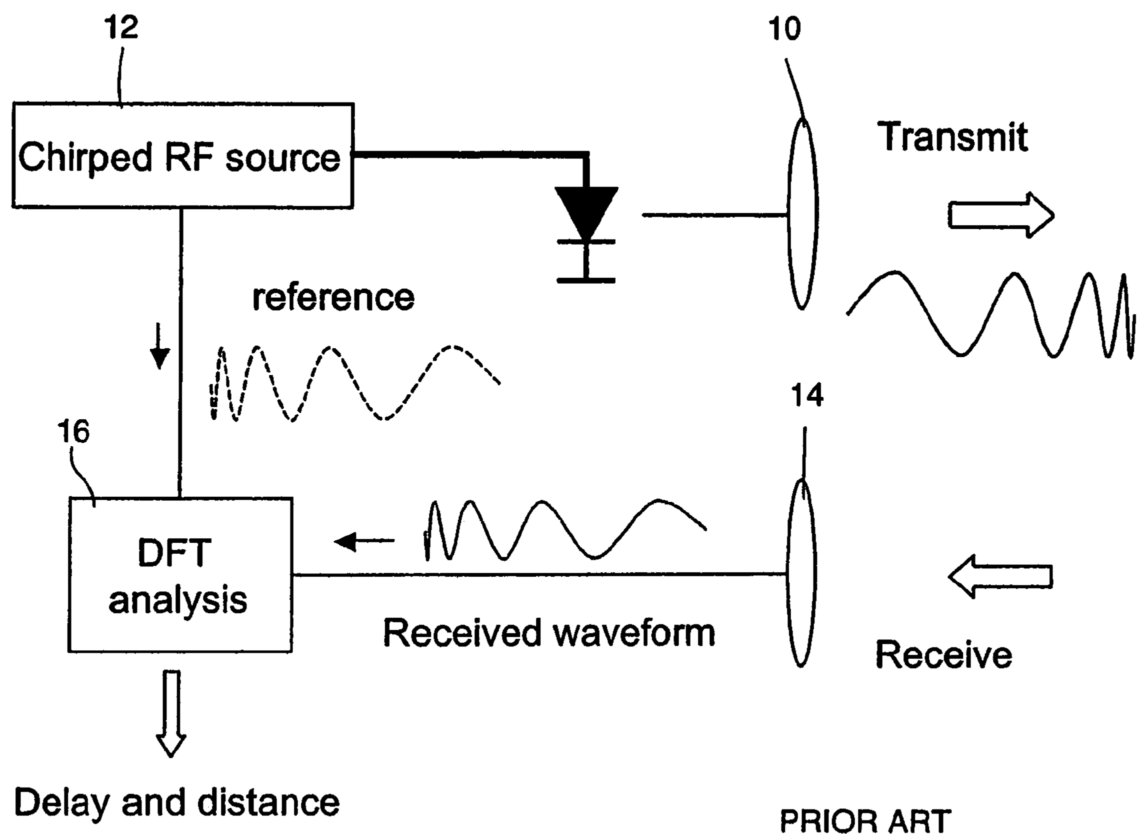
FIG. 1 is a diagram of a prior art long-range 3D laser radar system.

The architecture of a prior art long-range 3D laser radar is shown schematically by FIG. 1. A laser transmitter 10 is amplitude modulated (AM) with a chirped waveform from a Chirped RF source 12 to illuminate a target, which reflects some portion of the optical field back to a ladar receiver 14. The received signal is converted to an RF waveform at the receiver 14 and mixed with a chirped reference signal 16, which is a copy of the modulating signal at the transmitter 10. The Fourier transform of the mixed signal establishes the range to the target. The Fourier transform is calculated by a DFT analysis unit 18.

The range resolution of such a chirped ladar is limited by the speed of the electronics involved. For example, consider a processing speed of about 1 GHz, which translates to approximately 30 cm of range resolution. Augmenting such a ladar with the quasi cw optical FM modulation technique disclosed herein improves the spatial resolution of the system to 1 mm or better.

Figure 2:
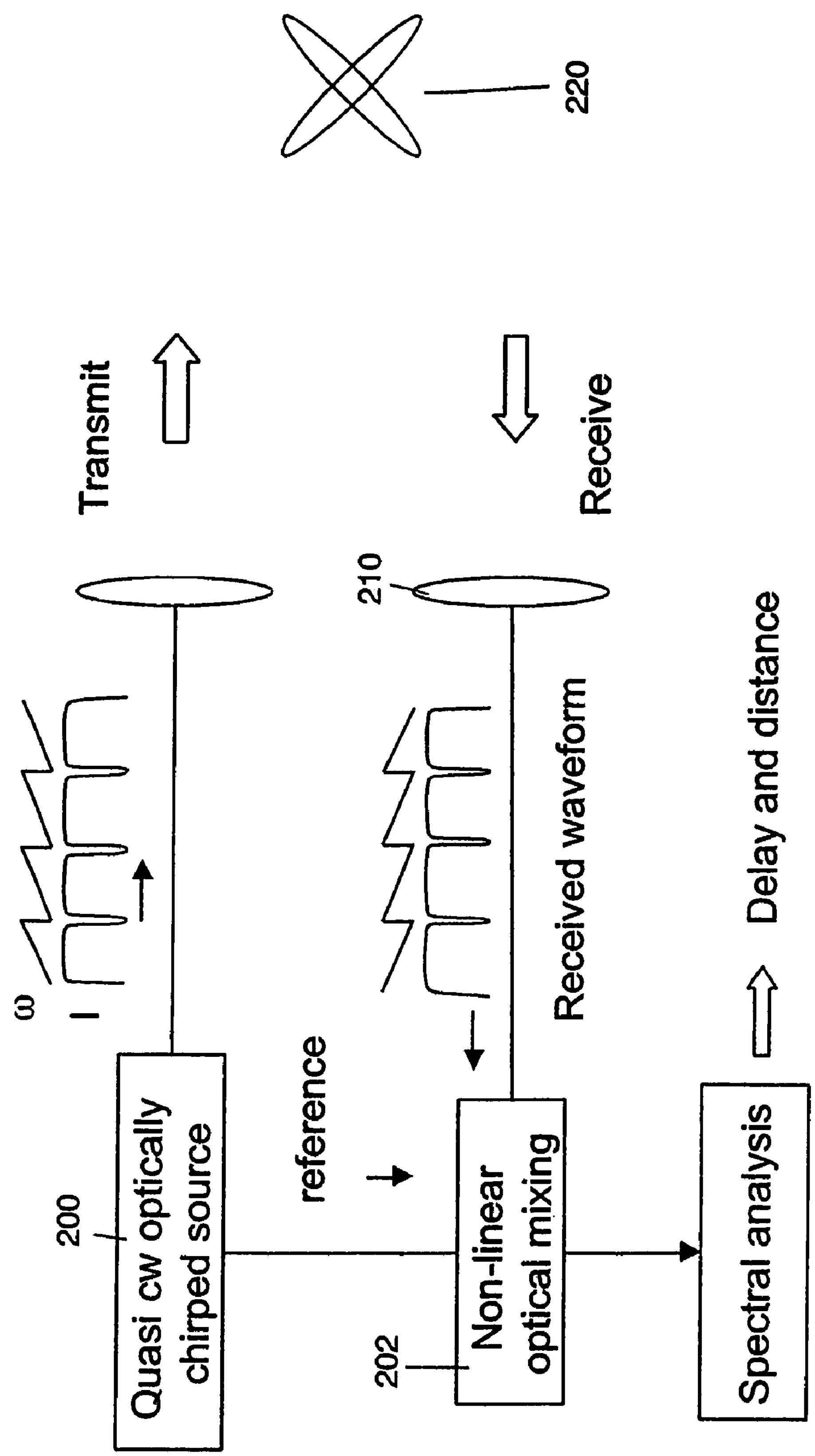
FIG. 2 is a block diagram of the high-resolution part of the disclosed laser radar system.
Figure 3:
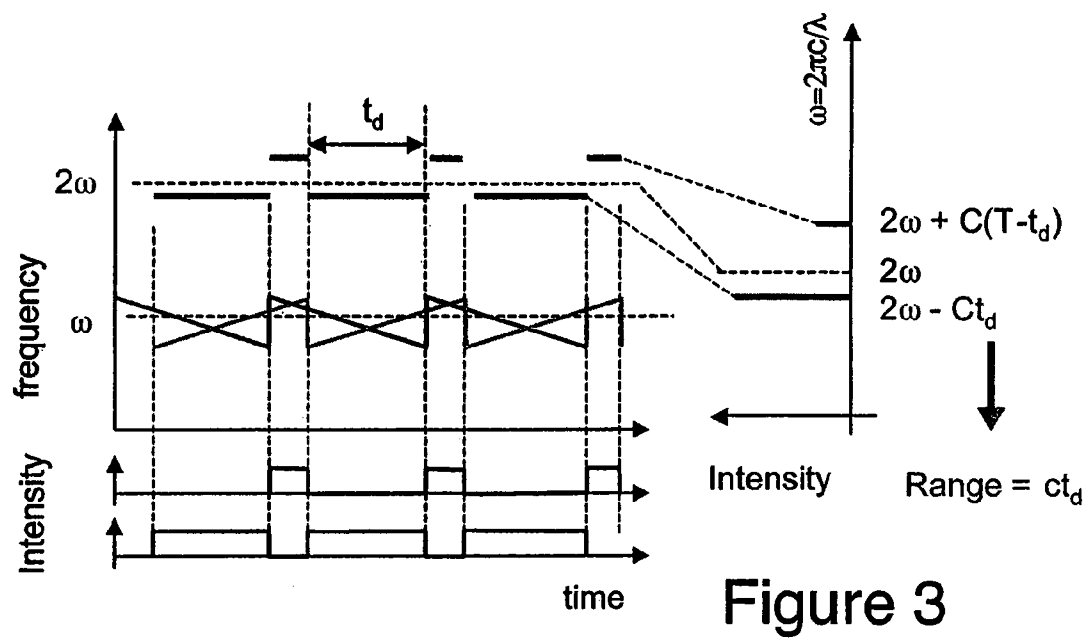
FIGS. 3 and 4 depict the spectral properties of the non-linearly generated light containing information about the distance to the target for sum and difference frequency generation in non-linear crystals being respectively depicted.
Figure 4:
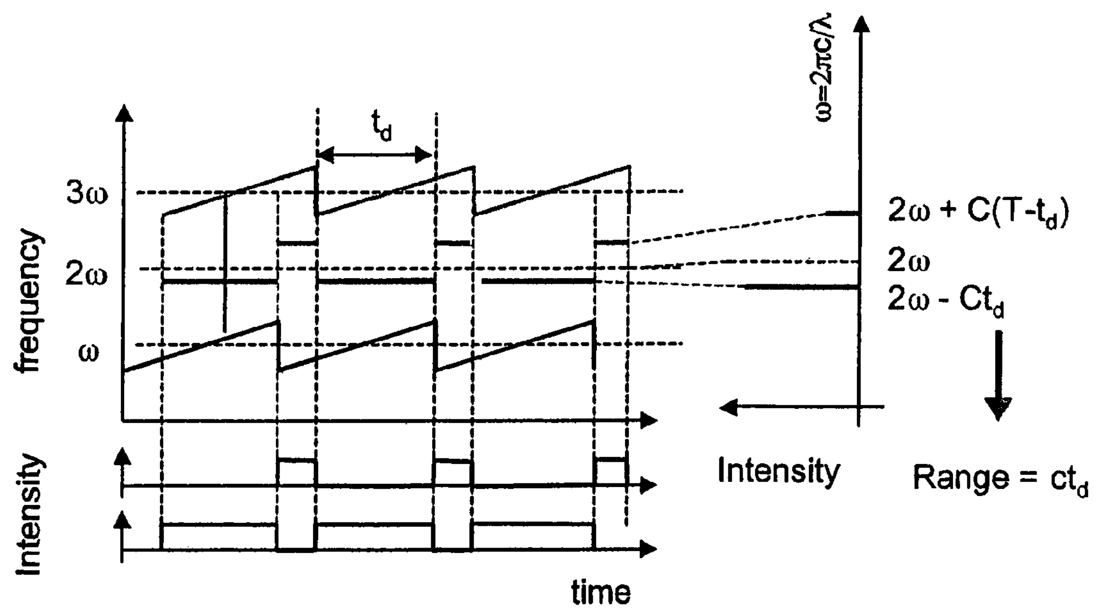

The block diagram of the high-resolution part of the proposed ladar is shown by FIG. 2. An optical source 200 produces chirped optical pulses whose frequency changes linearly with time, i.e., $\omega=\omega_o+Ct$, and the pulse duration is close to the repetition period (quasi cw radiation). The optical source illuminates a target 220 (shown schematically for ease of illustration, but the target can be anything that radars and ladars traditionally search for) that scatters a portion of the light back into collecting optics of the ladar's receiver 210 (represented by a lens in FIG. 2). The delayed back-scattered optical waveform is mixed optically with a reference waveform in a non-linear medium 202 to produce optical radiation at a new frequency. As shown in FIGS. 3 and 4, the spectral properties of the non-linearly generated light contains information about the distance to the target. Different approaches that may be chosen for non-linear optical mixing fall into two general categories: sum and difference frequency generation in non-linear crystals, including quasi-phase matched material (QPM). The chirp properties of signal and reference optical waves preferably utilized for the two approaches, as well as the preferable spectral properties of non-linearly-generated light are shown in FIGS. 3 and 4, respectively.

In the sum-frequency approach, the chirps of the signal and reference waves are equal in value and differ in sign. As seen in FIG. 3, the mixing of signal and the reference beams produces two spectral lines at $2\omega+C(T-t_d)$ and $2\omega-Ct_d$, where T is the clock period, C is the pulse chirp, and $t_d$ is the delay between the signal and reference waveforms. It should be pointed out that, if the signal and reference beams have an identical wavelength, the sum frequency is equal to the second harmonic frequency of each radiation. The contribution of the second harmonic may be removed from the sum frequency (which carries the useful information about the range to the target) by employing conventional non-collinear mixing. The signal and reference beams are focused into a non-linear crystal at an angle Φ (see FIG. 6) with respect to each other, and the sum frequency is generated along the line bisecting this angle, whereas the second harmonics propagate along the corresponding fundamental beams. The sum frequency radiation is filtered out from the second harmonics with a spatial filter.

In the difference-frequency approach, the chirps of the signal and reference waves are equal in both value and sign. FIG. 4 illustrates difference frequency generation at 2ω by mixing signal and reference waves at ω and 3ω, respectively. As seen in FIG. 4, the mixing of signal and the reference beams produces two spectral lines at $2\omega+C(T-t_d)$ and $2\omega-Ct_d$, where T is the clock period, C is the pulse chirp, and $t_d$ is the delay between the signal and reference waveforms. Since the frequency of the generated wave is well separated spectrally from the frequencies of the fundamentals, collinear mixing may now be employed. In this case, one may choose to use a wave-guiding non-linear medium, e.g., an in-diffused waveguide in periodically-poled lithium niobate (PPLN). Such waveguiding non-linear devices are well known in the art to produce high non-linear conversion efficiency with low input powers. Other non-linear optical devices will also likely be suitable in this application.

It should be noted that the same basic scheme may be used if one chooses to mix signal and reference waves at ω and 2ω, respectively, producing the third wave at around ω. In this case, however, non-collinear mixing should be employed to separate the mixed signal at ω from that of the fundamental.

Chirp and spectral resolution requirements may be derived from the required range resolution, which in turn is determined by the accuracy of measuring the optical wavelength (frequency) of the non-linearly generated signal. As has been mentioned already, non-linear mixing of a delayed signal with reference beam produces two spectral components. The temporal envelope of each component is a series of nearly rectangular pulses, as illustrated in FIGS. 3 and 4 for the sum and difference frequency schemes, respectively. The spectrum of each spectral line is given by the Fourier transform of the corresponding rectangular pulse, i.e., $(\sin(\omega\tau/2)/\omega\tau/2)^2$, where τ is the pulse duration. Therefore, the uncertainty of determining the spectral position of the line is approximately $\pm\omega_{HWHM}\approx 1/\tau$. If one chooses to use the longest of the two pulses for determining the spectral shift, the spectral and range uncertainties are, respectively, $\delta\omega<2/T$ and $\delta R=0.5c\delta t_d=0.5c\delta\omega/C<c/TC=c/\Delta\Omega=\lambda^2/2\pi\Delta\lambda$, where Δω is the spectral width of the chirped pulse. Therefore, the spatial resolution of 1 mm requires the minimal optical bandwidth of $\Delta\lambda=0.25$ nm for $\lambda=1.55$ μm, which is equal to the bandwidth of a 10 ps transform limited (non-chirped) pulse. The wavelength of the mixed optical signal should be measured with a significantly higher accuracy, i.e., approximately $\delta\omega\sim 2/T$, which is of the order of 1-10% of the full bandwidth. Such high resolution is typically achieved with Fabry-Perot interferometers.

Figure 5:
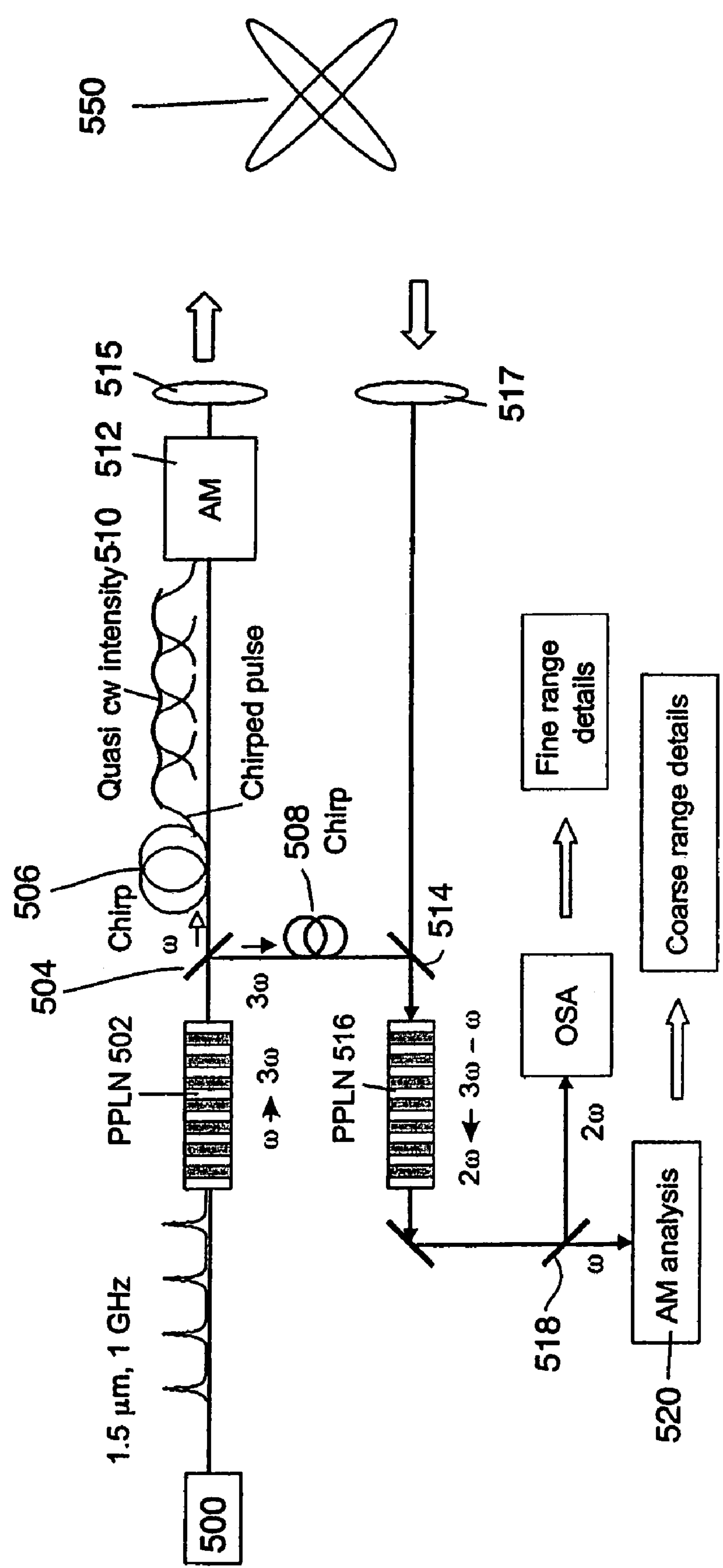
FIG. 5 is a block diagram of a hybrid ladar system with the disclosed high-resolution ladar being an add-on to a conventional AM chirped ladar.
Figure 6:
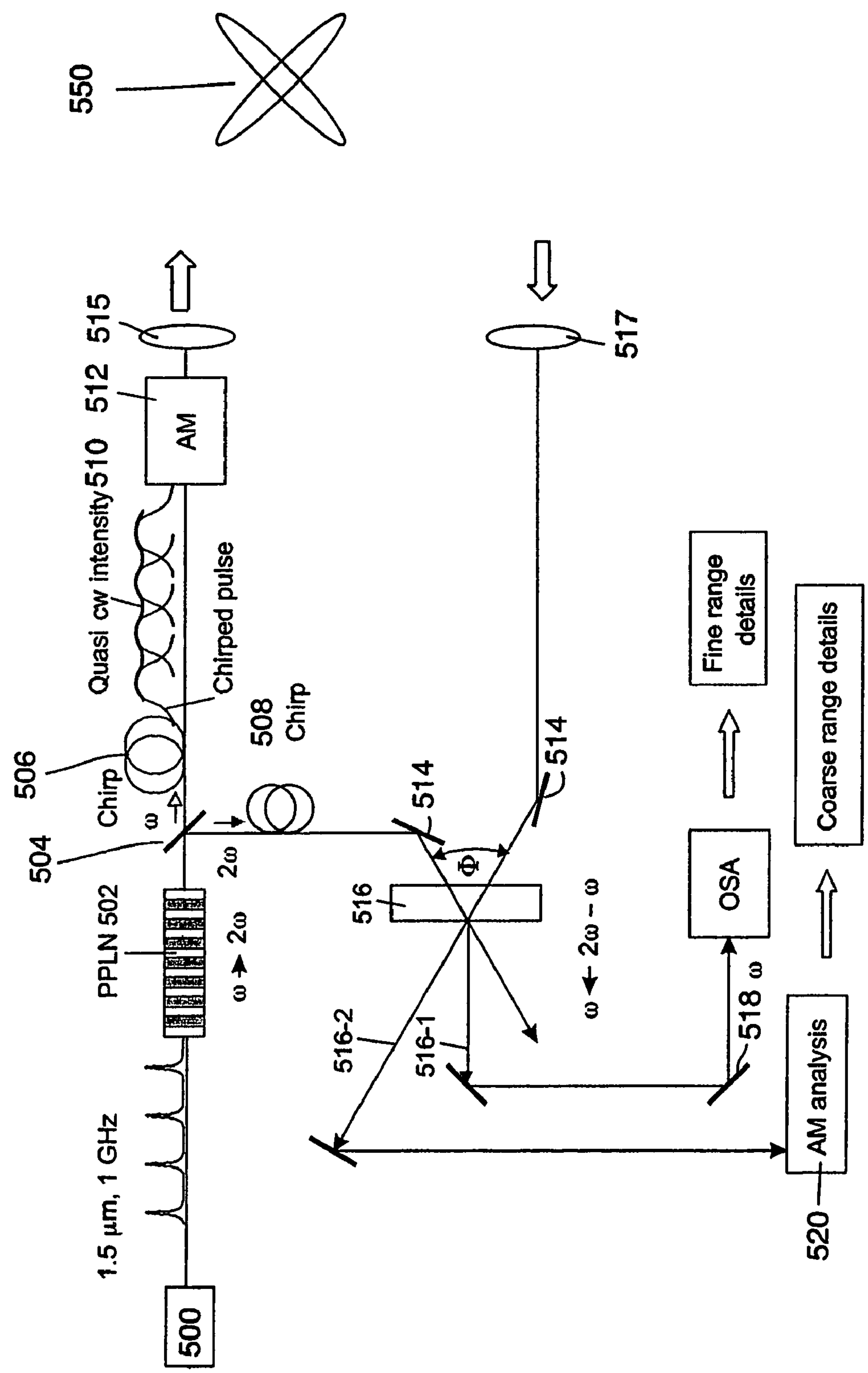
FIG. 6 is a block diagram of another embodiment of a hybrid ladar system with the disclosed high-resolution ladar being an add-on to a conventional AM chirped ladar.

The maximum unambiguous range achieved with the high-resolution ladar alone is equal to ~cT~30-50 cm, which is hardly sufficient for most applications. Therefore, it is proposed to use the high-resolution ladar as an add-on to a conventional AM chirped ladar. The architecture of such a hybrid device is shown in FIG. 5. In that figure the difference frequency scheme is chosen for illustrative purposes. The architecture of a device using the additive frequency scheme is depicted by FIG. 6. An optical source 500, preferably a short pulse laser, produces 1.55 μm pulses with sufficient optical bandwidth and a nearly-rectangular spectrum. Such nearly rectangular pulses may be obtained by filtering out the central part of the spectrum of shorter optical pulses having a significantly wider bandwidth.

In FIG. 5, a non-linear optical device 502, for example a PPLN device, is used for efficient generation of radiation at 3ω. This radiation is split off from the fundamental by a dichroic mirror 504 and chirped by a dispersive device 506, e.g., a grating pair or a dispersive fiber. Similarly, the fundamental beam acquires an identical chirp in another dispersive device 508. The magnitude of the chirp is chosen such that the duration of the chirped pulses preferably equals to the pulse period. As a result, quasi cw radiation 510 is produced. This radiation is encoded with a chirped AM signal, as is taught by the prior art documents cited above, using an amplitude modulation device 512. The resulting optical signal, which may be amplified as needed, is then directed toward a target 550 via appropriate transmission optics 515.

The collected back-scattered radiation from target 550 is collected using appropriate receiving optics 517 and mixed in another non-linear optical device 516 (and preferably a PPLN) preferably using a mirror 514 and a lens (not shown) to collinearly combine the collected back-scattered radiation from the target with radiation split off by dichroic mirror 504, thus producing a mixed optical signal at 2ω. The optical signal at this frequency is separated from the residual fundamental by a dichroic mirror 518 and analyzed spectrally, as described above, in a high resolution analyzer such as an Optical Spectrum Analyzer unit OSA. This spectral information provides details of the fine range resolution, albeit with a significant range ambiguity. The residual fundamental is used in the AM analysis unit 520, which has been described in the prior art document mentioned above, thus providing the required range with low spatial resolution. These two sets of data can be combined using an appropriately programmed computer, for example, to achieve long-range sensitivity with fine spatial resolution.

FIG. 6 is similar to the embodiment of FIG. 5, but uses the sum-frequency approach instead, as previously discussed above with reference to FIG. 3. In this embodiment, the second non-linear optical device is preferably a non-linear crystal such as lithium niobate. The signal and reference beams are focused into the non-linear crystal 516 at the angle Φ with respect to each other, and the sum frequency being generated along the line 516-1 bisecting this angle, whereas the second harmonics propagate along the corresponding fundamental beams (see 516-2). The sum frequency radiation is filtered out from the second harmonics with a spatial filter (the non-linear crystal 516 act as a spatial filter).

It should be noted that the non-linear medium used for mixing ladar and reference signals should have a sufficiently broad spectral response that covers the bandwidth of the employed chirped pulses. This should not represent a problem if PPLNs are used for non-linear conversion. Typically, the bandwidth of sum and difference frequency generation is, respectively, several nm and several tenth of nm. See, e.g., M. M. Fejer, G. A. Magel, D. H. Jundt, and R. L. Byer, "Quasi-Phase-Matched Second Harmonic Generation: Tuning and Tolerances," *IEEE J. Quantum. Electron*., vol. 28, 1992, p. 2631 and L. E. Myers, R. C. Eckardt, M. M. Fejer, and R. L. Byer, "Quasi phase-matched optical parametric oscillators in bulk periodically poled $LiNbO_3$," *J. Opt. Soc. Am. B*, vol. 12, 1995, p. 2102.

Having described this technology in connection with certain preferred embodiments, modification will now likely suggest itself to those skilled in the art. As such, the invention is not to be limited to the disclosed embodiments except as specifically requirement by the appended claims.

The invention claimed is:

1. An optical laser system comprising:

(a) a source of optical pulses generated at a frequency ω at an output thereof;

(b) a first non-linear optical device responsive to the output of the optical source for the generation of optical radiation at a frequency of Nω, where N=2 or 3;

(c) a first dispersive device for chirping the optical pulses at the frequency of ω;

(d) a second dispersive device for chirping the optical radiation at the frequency of Nω;

(e) an amplitude modulator for amplitude modulating the chirped optical pulses;

(f) transmission optics for transmitting amplitude modulated, chirped optical pulses to a target;

(g) reception optics for collecting back-scattered radiation for the target;

(h) a second non-linear optical device responsive to the collected back-scattered radiation at the frequency ω and to the chirped optical radiation at the frequency of Nω for producing an optical signal; and (i) analysis apparatus for determining relatively fine range resolution information based upon the optical signal produced by the second non-linear optical device and relatively coarse range resolution information based upon the collected back-scattered radiation at the frequency ω.

2. The optical laser system of claim 1 wherein N=3 and wherein the first and second non-linear optical devices comprise first and second periodically-poled lithium niobate (PPLN) devices.

3. The optical laser system of claim 2 wherein the collected back-scattered radiation at the frequency ω applied to the analysis apparatus is transmitted thereto via said second non-linear optical device.

4. The optical laser system of claim 3 wherein the collected back-scattered radiation at the frequency ω and the optical signal produced by the second non-linear optical device exit the second non-linear optical device collinearly and are thereafter spatially separated by a dichroic mirror.

5. The optical laser system of claim 1 wherein N=2 and wherein the first non-linear optical device comprises a periodically-poled lithium niobate (PPLN) device.

6. The optical laser system of claim 5 wherein the collected back-scattered radiation at the frequency ω applied to the analysis apparatus is transmitted thereto via said second non-linear optical device.

7. The optical laser system of claim 6 wherein the second non-linear optical device comprises a lithium niobate crystal.

8. The optical laser system of claim 5 wherein the collected back-scattered radiation at the frequency ω and the optical signal produced by the second non-linear optical device exit the second non-linear optical device spatially separated.

* * * * *